United States Patent [19]
Eckert et al.

[11] Patent Number: 5,638,490
[45] Date of Patent: Jun. 10, 1997

[54] FUZZY LOGIC DATA PROCESSOR

[75] Inventors: Kim H. Eckert, Austin, Tex.; William C. Archibald, Gillette, Wyo.; Ken Ota, Tokyo, Japan

[73] Assignee: Motorola Inc., Schaumburg, Ill.

[21] Appl. No.: 254,219

[22] Filed: Jun. 6, 1994

[30] Foreign Application Priority Data

Jun. 7, 1993 [JP] Japan ................................. 5-163084

[51] Int. Cl.$^6$ ........................................................ G06G 7/00
[52] U.S. Cl. ................................. 395/3; 395/61; 395/900
[58] Field of Search ................................. 395/3, 900, 10–11, 395/50–51, 60–61; 341/50, 61; 369/48

[56] References Cited

U.S. PATENT DOCUMENTS

| | | | |
|---|---|---|---|
| 4,875,184 | 10/1989 | Yamakawa | 364/807 |
| 5,184,131 | 2/1993 | Ikeda | 341/165 |
| 5,243,687 | 9/1993 | Ando et al. | 395/3 |
| 5,276,767 | 1/1994 | Nakamura | 395/3 |
| 5,363,472 | 11/1994 | Hisano | 395/3 |

OTHER PUBLICATIONS

Chen, B.-T., Y.-S. Chen, and W.-H. Hsu. "Design of a Parameterized Fuzzy Processor and its Application" IEEE Intl. Conf. on Systems Engineering Sep. 17, 1992.

*Primary Examiner*—Tariq R. Hafiz

[57] ABSTRACT

A data processor processes input data using fuzzy logic operations. The input data consists of n-bits (where n is a natural number greater than 2) and appears at a rate of $f$. The data processor outputs the processed data at a given number of bits and a given rate. The data processor includes a first converter (10), a fuzzy computing element (20), and a second converter (30). The first converter converts the input data into converted data consisting of m bits (where m is a natural number less than n and appearing at a rate of $(2^{n-m})f$. The fuzzy computing element performs fuzzy logic operations on the converted data and sends the processed data to the second converter. The second converter converts the process converts the process data into output data at the given rate and with the given number of bits.

4 Claims, 3 Drawing Sheets

| UPPER 2 BIT | CONVERTED INPUT DATA | MEAN VALUE |
|:---:|:---:|:---:|
| 0  0 | A, A, A, A | A |
| 0  1 | A, A, A, B | A + 0.25 |
| 1  0 | A, A, B, B | A + 0.50 |
| 1  1 | A, B, B, B | A + 0.75 |
*FIG.3*
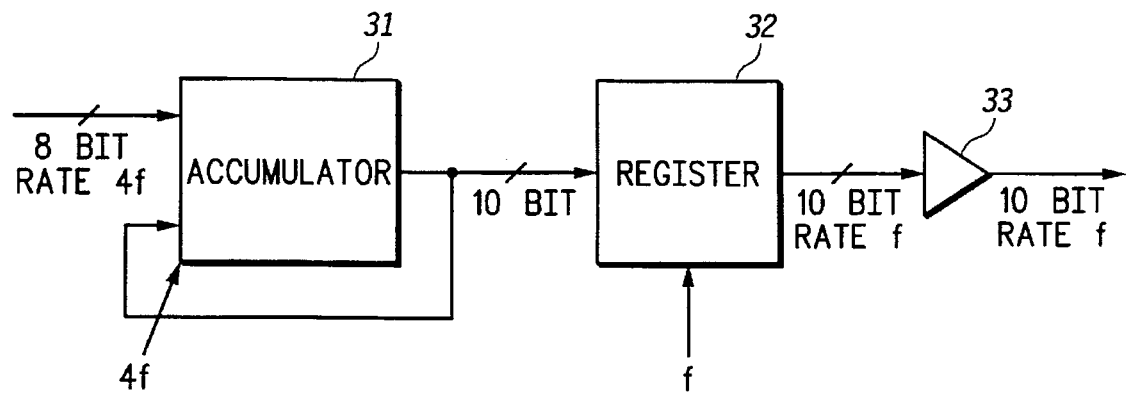
*FIG.4*
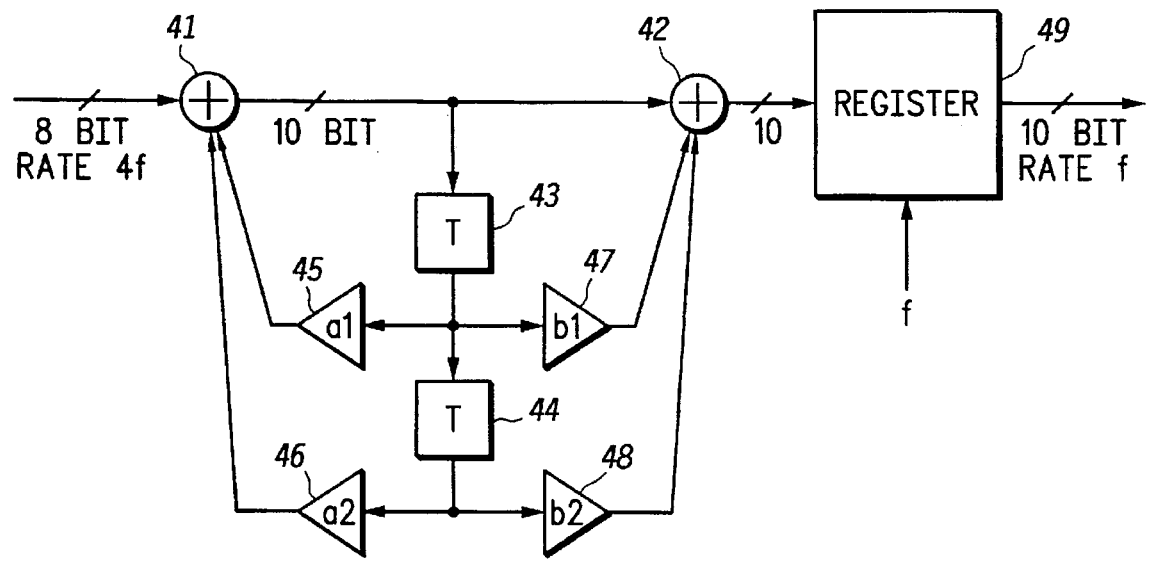
*FIG.5*

FUZZY LOGIC DATA PROCESSOR

FIELD OF THE INVENTION

This invention relates in general to data processing, and more specifically, to a fuzzy logic data processor for controlling various consumer electronics, automobiles etc.

BACKGROUND OF THE INVENTION

Various controlling systems, including fuzzy logic computers, are widely utilized to control various consumer electronics, automobiles, actuators such as electronic switches, motors, or valves, and other electronic systems. Analog data to be processed in a fuzzy computer, such as temperature, pressure or speed detected by sensors, is converted to digital data having a predetermined number of bits and a predetermined sampling rate. After processing by the fuzzy computer, the output digital data is, in general, of the same number of bits and sampling rate as the digital input data. This output data is reconverted, if necessary, to analog form in order to be supplied to the actuators.

Prior art fuzzy logic schemes are implemented through software and are stored in the memory of the control system to be executed by a digital processor. Since the schemes are implemented through software, the systems to be controlled must generally run at relatively low operating speeds, such as air conditioning systems. To extend the use of fuzzy logic to more complex and high speed systems, such as driving controllers and suspension control for automobiles, there must be a substantial reduction in computation time. To do this requires the software scheme to be replaced by dedicated hardware. Unfortunately, under the prior art such dedicated hardware would be complex, large, and very expensive to manufacture. To make fuzzy logic practical for higher speed systems, a smaller size, low cost hardware scheme is needed.

BRIEF DESCRIPTION OF THE DRAWING

FIG. 3 is a chart explaining the operation of the input data converter 10 of FIG. 2.

FIG. 4 is a block diagram illustrating a configuration of the output data converter 30 of FIG. 1.

FIG. 5 is a block diagram illustrating another embodiment of the output data converter 30 of FIG. 1.

DETAILED DESCRIPTION OF THE INVENTION

Figure 1:
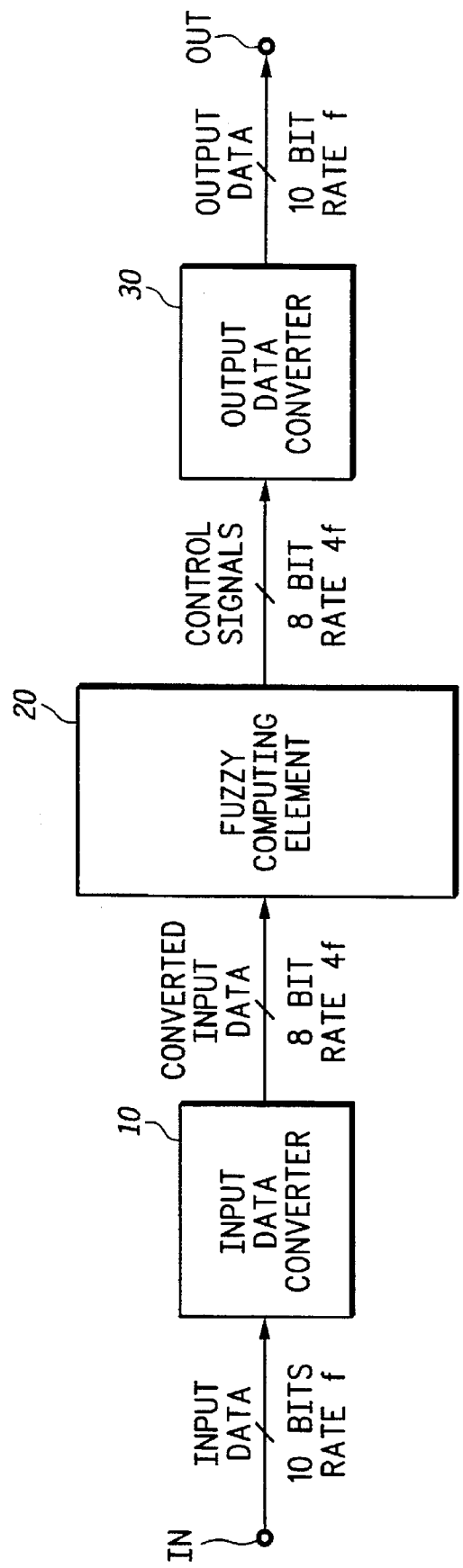
FIG. 1 is a block diagram illustrating a data processor according to the present invention.

FIG. 1 shows a diagram of a fuzzy computer 9 according to the present invention. Fuzzy computer 9 comprises input data converter 10, fuzzy computing element 20 and output data converter 30, all coupled in series. Input data converter 10 operates as a modulator, and output data converter 30 operates as a decimator.

Digital input data are supplied to an input (IN) from sensors of a system to be controlled through analog to digital (A/D) converters (not shown). The digital input data is supplied in 10 bit form at a rate of $f$ (or a frequency of $1/f$). Generally, a plurality of sensors are associated with each system to be controlled, and each sensor has a corresponding input data converter 10. For ease of explanation, only one input data converter 10 will be considered throughout the following description. It is assumed, for purposes of this description, that the rate $f$ of the digital input data is equal to the rate of the A/D conversion process previous to the input IN.

In the preferred embodiment, the digital input data is input to input data converter 10 where it is converted from 10 bits to the upper 8 bits of the original 10, and output at a rate of $4f$ (four times the original rate $f$). The converted digital input data is supplied to fuzzy computing element 20 where it is processed according to fuzzy inference rules. Fuzzy computing element 20 outputs 8 bit control signals at a rate of $4f$ to output data converter 30 where it is converted to 10 bit digital output data and supplied at a rate of $f$. The 10 bit digital output data is converted to analog through digital to analog (A/D) converters (not shown) and supplied to actuators of the system being controlled.

Figure 2:
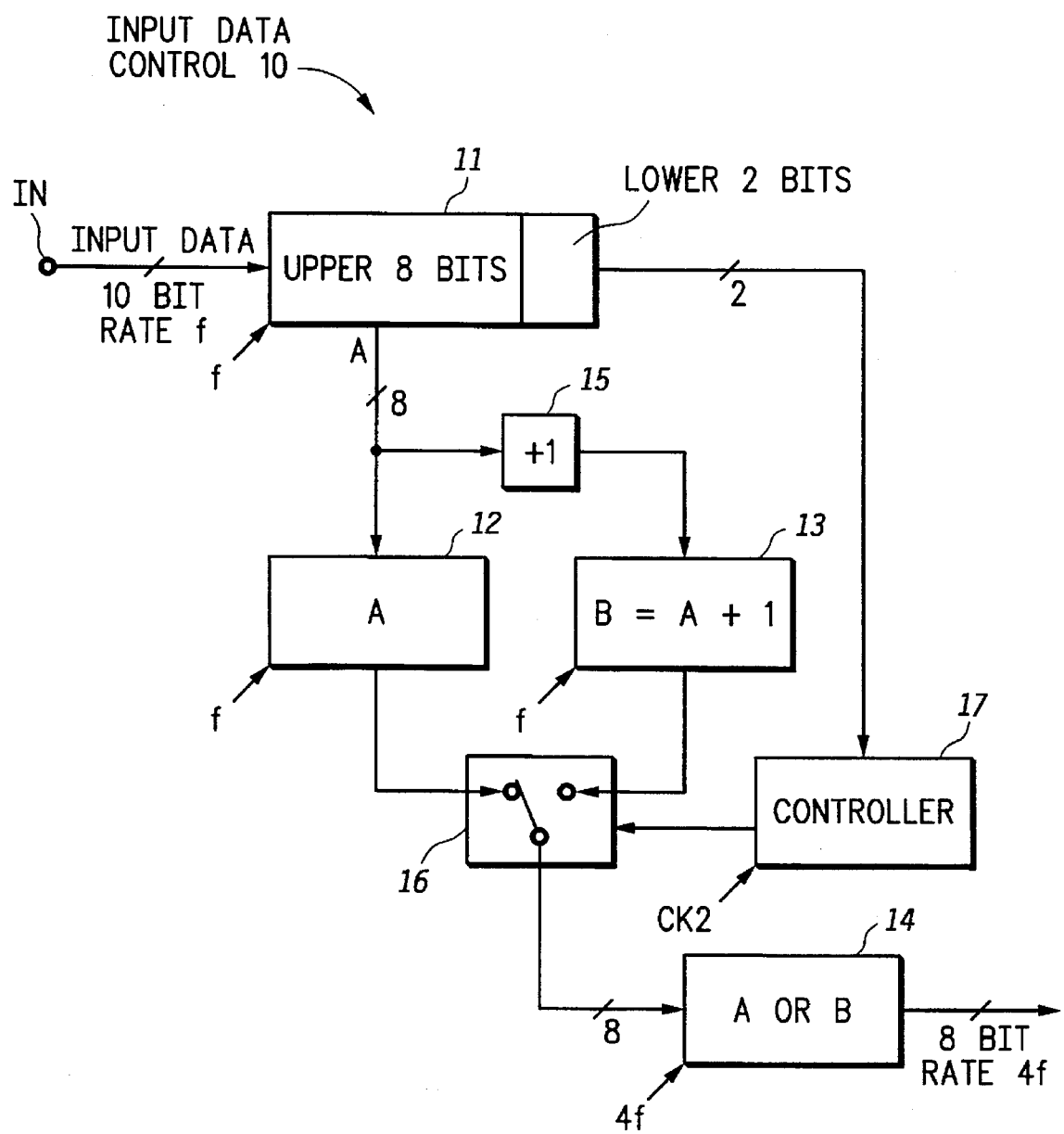
FIG. 2 is a block diagram illustrating a configuration of the input data converter 10 of FIG. 1.

FIG. 2 shows an input data converter 10 in more detail. Input data converter 10 comprises data registers 11–14, adder 15, selector 16, and controller 17. The 10 bit digital input data (rate $f$) are latched in data register 11 synchronous with a clock signal having a frequency $f$. The upper 8 bits (A) of the 10 bits latched in register 11 are transferred to register 12 synchronous with clock frequency $f$. At the same time, the 8 bit data A is transferred, synchronous with clock frequency $f$, to adder 15 where A is increased by 1. This increased data, labelled B (where B=A+1) is sent to register 13 synchronous with clock frequency $f$.

Controller 17 is coupled to register 11 to receive the lower two bits from the original 10 bit digital input data. Controller 17 comprises ripple counters and associated logic circuits which control selector 16 based upon the information contained in the lower 2 bits from register 11. Selector 16 allows either A or B to pass to register 14 synchronous with a clock signal having a frequency of $4f$ as controlled by controller 17. Accordingly, for every 10 bit digital input data supplied to register 11, 4 samples consisting of a combination of A and/or B will be selected by selector 16. The selection of A or B is dependent upon the combination of information contained in the lower 2 bits of the original input data as supplied to controller 17. The A and/or B data supplied to register 14 are output to fuzzy computing element 20 as 8 bit data synchronous with the $4f$ frequency clock signal.

FIG. 3 shows the four possible combinations of the lower 2 bits with associated A/B combinations to further explain the selective transfer of A and B by controller 17 and selector 16. If the information contained in the lower 2 bits latched in register 11 are "0 0", data A will be selected by selector 16 all 4 sampling times. If the lower 2 bits are "0 1", data A will be selected 3 times and data B will be selected once. As mentioned earlier, the samples are synchronous with clock signal $4f$. If the lower 2 bits latched in register 11 are "1 0", data A will be selected twice and data B will be selected twice. Finally, if the lower 2 bits are "1 1", data A will be selected once and data B will be selected three times. While the number of times A or B is selected is important, the order in which they are selected is not important. Various orders of the 4 selections are possible as long as the ratio of A to B remains the same for each lower 2-bit combination.

A mean value of the number of A's and B's selected can be calculated as follows:

| Lower two bits | Mean value of A and B |
|---|---|
| "0 0" | (A+A+A+A)/4 = 4A/4 = A |
| "0 1" | (A+A+A+B)/4 = (4A+1)/4 = A + 0.25 |
| "1 0" | (A+A+B+B)/4 = (4A+2)/4 = A + 0.50 |
| "1 1" | (A+B+B+B)/4 = (4A+3)/4 = A + 0.75 |

Using the above, the four mean values which are possible between A and B can be determined by separating the lower two bits of the 10 bits latched in register 11 from the upper 8 bits, increasing the sampling rate four times, and determining a mean value from the four successive samples. The mean values can be utilized in output data converter 30 to reconstitute the 8 bit data into a 10 bit data output. The two bit mean values make up the lower two bits of data added to the upper 8 bits in output data converter 30 to make 10 bits of output data. The sampling rate is then decreased by a factor of 4 to output the data from output data converter 30 at the original rate of $f$. In the preferred embodiment, the mean values are generated from the 4 samples in output data converter 30.

Fuzzy computing element 20 of FIG. 1 processes the converted digital input data according to appropriate fuzzy inference rules to produce digital output data. Since the internal process of fuzzy computing element 20 is not an element of the present invention, only a brief explanation of the process will be given here.

In the fuzzy computation, input information is matched against input labels or groupings. The degree of matching, or grades, is determined according to how much the input information matches to each separate input label. The grades of input labels are input as an antecedent portion of various fuzzy rules where a min-max calculation is performed to generate grades of output labels. The output labels are used with predetermined single-tone data points from a membership function for each output label to calculate the center of gravity (or weighting of all the points) of the output labels.

The fuzzy inference of fuzzy computing element 20 may be implemented in software which is how most prior art fuzzy computers operate. However, high speed calculations require hardware implementations such as the fuzzy computers disclosed in Japanese patent applications Hei 4-283934, Hei 4-2839345, Hei 4-293698, Hei 4-332401, Hei 4-332402, and Hei 5-97154.

FIG. 4 shows an embodiment of output data converter 30 according to the present invention. Output converter 30 comprises accumulator 31 coupled to fuzzy computing element 20 to receive the 8 bit output, data register 32 coupled to accumulator 31, and multiplier 33 coupled to data register 32. The four 8-bit samples at a sampling rate of $4f$ are supplied to accumulator 31 synchronous with a clock signal of $4f$. The four samples are accumulated in accumulator 31 at a rate of $4f$ to produce accumulated data consisting of 10 bits (as an example, if the lower two bits as shown in FIG. 3 were "1 0", the accumulated data would be A,A,B,B, or A+A+(A+1)+(A+1)=4A+2). The accumulated data is latched in register 32 synchronous with a clock signal frequency of $f$, and the contents of accumulator 31 are reset to zero. The 10-bit accumulated data is then output to multiplier 33 where it is multiplied by ¼ to complete the computation for the mean value of the four samples. The resultant is a 10-bit signal at rate $f$.

In principle, output data converter 30 is like a decimator or a digital low pass filter. Other configurations of the output data converter 30 are therefore possible. For example, FIG. 5 shows one variation of output data converter 30 which is a BIQUAD type IIR filter. The BIQUAD type IIR filter comprises adders 41 and 42, delay circuits 43 and 44 which delay data one cycle of the clock signal frequency $4f$, multipliers 45 through 48, and register 49.

The present embodiment has been described in terms of a 10-bit input data configuration converted to an 8-bit configuration for processing in a fuzzy computer at four times the original clock signal. It should be recognized that input data of n-bits can be converted to data of m-bits with the sampling rate increased by $2^{n-m}$ times, where n is a natural number equal to or larger than two and m is a natural number smaller than n. Further, although the above description is in terms of fuzzy logic processing, the present invention may be used with other processing schemes having an appropriate data processor such as an image processor.

Although the embodiment above described input data and output data as having the same bits of information and the same sampling rate, the number of bits and sampling speed may vary between input and output data, considering differences of characteristics such as speed of response or sensitivity between input circuitry and output circuitry.

As described above, the present invention reduces the size of the processing circuit (fuzzy computing element 20) which comprises the largest share of the whole circuit. The processing circuit is reduced by reducing the number of bits processed (from 10 to 8). The reduction of precision of control associated with the reduction in size of the processing circuit is compensated for by increasing the rate at which the data is processed. The rate increase does not equate to a significant size increase when the processing circuit is implemented in hardware. As a result, high speed computations can be accomplished with the same precision as slow speed computations with a reduction in size of the processing element, and hence, a reduction in manufacturing costs.

We claim:

1. A fuzzy logic data processor for processing input data consisting of n bits (where n is a natural number greater than 2) appearing at a rate of $f$ and outputting the processed data at a given number of bits and appearing at a given rate, the data processor comprising:

first converter for converting the input data into converted data consisting of m bits (where m is a natural number less than n) and appearing at a rate of $(2^{n-m})f$;

a fuzzy computing element coupled to the first converter, the data processor processing the converted data;

second converter coupled to the fuzzy computing element and receiving the processed converted data; and the second converter converting the processed converted data into output data having the given number of bits and appearing at the given rate.

2. The fuzzy logic data processor for processing input data consisting of n bits (where n is a natural number greater than 2) appearing at a rate of $f$ and outputting the processed data at a given number of bits and appearing at a given rate according to claim 1 wherein the given number of bits is n and the given rate is $f$.

3. A fuzzy logic data processor for processing input data consisting of n bits (where n is a natural number greater than 2) appearing at a rate of $f$ and outputting the processed data at a given number of bits and appearing at a given rate according to claim 1 wherein the first converter comprises:

first register wherein the input n-bit data is latched, the input n-bit data separated into m bits and (n-m) bits within the first register;

second register coupled to the first register and latching the m bits;

adder coupled to the first register to receive the m bits therefrom, the adder adding a 1 to a value of the m bits;

third register coupled to the adder and latching the m bits plus 1 data;

controller coupled to the first register and receiving the n-m bits therefrom;

switch selectively coupled to the second and third registers, and coupled to the controller to receive a control signal therefrom;

the controller switching switch 16 between the second and third register, depending upon the information contained in the n-m bits, at a rate of $(2^{n-m})f$ to generate $2^{n-m}$ samples;

fourth register latching the $2^{n-m}$ samples; and the fourth register coupled to the data processor to output the $2^{n-m}$ samples thereto.

4. The fuzzy logic data processor for processing input data consisting of n bits (where n is a natural number greater than 2) appearing at a rate of $f$ and outputting the processed data at a given number of bits and appearing at a given rate according to claim 3 wherein the second converter takes a mean value of the $2^{n-m}$ samples to generate the output data having the given number of bits and appearing at the given rate.

* * * * *